US010121604B2

(12) United States Patent
Shelke et al.

(10) Patent No.: US 10,121,604 B2
(45) Date of Patent: Nov. 6, 2018

(54) NANOCOMPOSITE OF MULTILAYER FULLERENES WITH TRANSITION METAL OXIDE NANOPARTICLES AND A PROCESS FOR THE PREPARATION THEREOF

(71) Applicant: Council of Scientific & Industrial Research, New Delhi (IN)

(72) Inventors: Manjusha Vilas Shelke, Maharashtra (IN); Vedi Kuyil Azhagan Muniraj, Maharashtra (IN); Mukta Vinayak Vaishampayan, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 15/473,181

(22) Filed: Mar. 29, 2017

(65) Prior Publication Data

US 2017/0207034 A1    Jul. 20, 2017

Related U.S. Application Data

(62) Division of application No. 14/541,536, filed on Nov. 14, 2014.

(51) Int. Cl.
| | |
|---|---|
| *H01G 11/36* | (2013.01) |
| *H01B 1/02* | (2006.01) |
| *B82Y 40/00* | (2011.01) |
| *H01G 11/86* | (2013.01) |
| *H01G 11/46* | (2013.01) |
| *H01G 11/38* | (2013.01) |

(52) U.S. Cl.
CPC ............. *H01G 11/36* (2013.01); *H01G 11/38* (2013.01); *H01G 11/46* (2013.01); *H01G 11/86* (2013.01)

(58) Field of Classification Search
CPC ......... B82Y 40/00; C01B 32/154; H01B 1/34; H01B 1/36
USPC .................................................. 252/500, 506
See application file for complete search history.

(56) References Cited

U.S. PATENT DOCUMENTS 9,824,828 B2 * 11/2017 Yang ..................... H01G 11/36
2015/0306570 A1    10/2015 Mayes et al.

FOREIGN PATENT DOCUMENTS

WO    WO 2013/070989 A1    5/2013
WO    WO 2014/062133 A1    4/2014

OTHER PUBLICATIONS

Dubey "Gram scale synthesis of green fluorescent water soluble onion-like carbon nanoparticles from camphor and polystyrene foam." RSC Adv., 2014, 4, 5838 (Year: 2014).*

(Continued)

*Primary Examiner* — Tri V Nguyen
(74) *Attorney, Agent, or Firm* — Knobbe, Martens, Olson & Bear, LLP

(57) ABSTRACT

Disclosed is a simple, cheaper and green approach for low temperature synthesis of functionalized multilayer fullerene from the pure ghee (clarified butter) to obtain activated multishell graphitized non-porous fullerene in the form of nano-onions (CNOs), for fabricating high performance exohedral type of super capacitors by incorporating suitable transition metal oxide. Further, the approach relates to an exohedral type supercapacitor composite, containing non-porous CNOs and transition metal oxide nanoparticles with enhanced specific capacitance in 0.5 M $H_2SO_4$.

3 Claims, 8 Drawing Sheets

(56) References Cited

OTHER PUBLICATIONS

Borgohain, R., et al., Electrochemical Study of Functionalized Carbon Nano-Onions for High-Performance Supercapacitor Electrodes, J. Phys. Chem C 116:15068-15075, 2012.

Chen, S., et al., Graphene Oxide-$MnO_2$ Nanocomposites for Supercapacitors, ACS Nano 4(5):2822-2830, 2010.

Gao, Y., et al., High-Performance Flexible Solid-State Supercapacitors Based on $MnO_2$-Decorated Nanocarbon Electrodes, RSC Adv. 3:20613-20618, 2013.

Hsieh, T. F., et al., Hydrous Ruthenium Dioxide/Multi-Walled Carbon-Nanotube/Titanium Electrodes for Supercapacitors, Carbon 50:1740-1747, 2012.

Jariwala, D., et al., Carbon Nanomaterials for Electronics, Optoelectronics, Photovoltaics, and Sensing, Chem. Soc., Rev. 42:2824-2860, 2013.

Kim, J. Y., et al., Microwave-Polyol Synthesis of Nanocrystalline Ruthenium Oxide Nanoparticles on Carbon Nanotubes for Electrochemical Capacitors, Electrochimica Act 55:8056-8061, 2010.

Miller, J.R., and P. Simon, Electrochemical Capacitors for Energy Management, Science 321:651-652, 2008.

Plonska-Brzezinska, M.E., and L. Echegoyen, Carbon Nano-Onions for Supercapacitor Electrodes: Recent Developments and Applications, J. Mater. Chem. A. 1:13703-13714, Aug. 14, 2013.

Pushparaj, V.L., et al., Flexible energy storage devices based on nanocomposite paper, Proceedings of the National Academy of Sciences 104(34):13574-13577, 2007.

Sharma, R.K., Carbon-Supported, Nano-Structured, Manganese Oxide Composite Electrode for Electrochemical Supercapacitor, J. Power Sources 173:1024-1028, Sep. 2, 2007.

Sugimoto, W., et al., Charge Storage Mechanism of Nanostructured Anhydrous and Hydrous Ruthenium-Based Oxides, Electrochimica Acta 52:1742-1748, 2006.

Yang, M., et al., Functionalization of Multiwalled Carbon Nanotubes With Polyamide 6 by Anionic Ring-Opening polymerization Carbon 45: 2327-2333, 2007.

Zhai, Y., Carbon Materials for Chemical Capacitive Energy Storage, Adv Mater 23:4828-4850, 2011.

\* cited by examiner

NANOCOMPOSITE OF MULTILAYER FULLERENES WITH TRANSITION METAL OXIDE NANOPARTICLES AND A PROCESS FOR THE PREPARATION THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention provides a nanocomposite of multilayer fullerenes with transition metal oxide nanoparticles and a process for the preparation thereof. Particularly, the present invention relates to nanocomposite of multilayer fullerenes with transition metal oxide nanoparticles with enhanced specific capacitance. More particularly, this invention relates to a simple, cheaper and green approach for synthesis of activated multilayer graphitized fullerene in the form of nano-onions (CNOs) at low temperature from the pure ghee (clarified butter) for fabricating high performance exohedral type of super capacitors by incorporating suitable transition metal oxide.

Further the invention relates to supercapacitor composite electrode, comprising CNOs and transition metal oxide ($MnO_2$) nanoparticles with enhanced specific capacitance.

Description of the Related Art

Carbon nanostructures with excellent properties such as mechanical, thermal, electronic, and electrical properties, coupled with chemical robustness, have spurred a broad range of applications. Various stable forms of structural organization of carbon atoms can exist on the nanoscale that includes zero dimensional, one-dimensional, and two-dimensional carbon nanomaterials viz. carbon nanotubes (CNTs), fullerenes, graphene, carbon quantum dots, nanodiamond and carbon nanoonions (CNOs) etc (D. Jariwala, et al. Chem. Soc. Rev., 2013, 42, 2824). With the recent advances in synthesis, fabrication and assembly techniques, carbon nanomaterials are experiencing renewed interest from researchers as a basis of numerous scalable technologies especially in the energy conversion and energy storage fields e.g. electrochemical capacitors.

Electrochemical capacitors, also called supercapacitors, store energy using an accumulation of ions of opposite charge in a double layer at an electrochemically stable, highly specific surface area electrode (J. R. Miller and P. Simon, Science, 2008, 321, 651). The electrochemical capacitors are considered to be very attractive energy storage devices, as they have high power density and cycling stability and are used to power hybrid electric vehicles, portable electronic equipment and other devices.

ESC stores charges by non-faradic capacitive process associated with the interfaces of solution and large surface area of active material and pseudocapacitive faradic redox reactions. Typically involves no change in chemical phase and composition and can be used for thousands of cycles without significant loss of capacity (Proceedings of the National Academy of Sciences, 2007, 104, 13574-13577).

Carbon nanomaterials have been extensively researched, either in an electric double layer capacitor as the carbon electrode or in pseudocapacitors that employ a composite of highly conducting carbon with a material such as a metal oxide. Porous activated, templated and carbide-derived carbons, multi- and single-walled carbon nanotubes and multilayer graphene have been used as the electrode materials in supercapacitors. A significant portion of the research is concentrated on CNTs and graphene based composite electrodes due to their excellent electrical and mechanical properties, chemical stability and high specific surface area. Capacitance as high as 200-400 F/g can be obtained from composites of graphene/CNTs with pseudocapacitive materials like metal oxides (Chen, J. Zhu et al. ACS Nano, 2010, 4, 2822) or polymers (ACS Nano, 2012, 6, 5941).

It is noteworthy, that the electrochemical performance of ESCs is greatly depend on the electroactive materials such as double layer capacitive carbon allotropes and pseudocapacitive electroactive oxides or hydrous oxides like $MnO_2$, $RuO_2$ and sulfide materials like ZnS and CoS and conductive polymers etc.

Inorganic pseudocapacitive materials such as $MnO_2$, $RuO_2$ store charge via redox reactions. Such inorganic electrochemical capacitors use an aqueous electrolyte to reduce the risk of explosion at high temperatures, improve the power density, and show higher efficiency than organic based supercapacitors.

The composite of supercapacitor comprising carbonaceous material and transition metal oxide pseudocapacitor material is reported in some state of arts.

WO2013070989 (Xie Ming et al.) discloses supercapacitor comprising at least two electrodes, each electrode being in electrical contact with an electrically conductive current collector, wherein at least one of the electrodes is a composite of a porous carbonaceous material, having a metal oxide pseudocapacitor material deposited thereon via an atomic layer deposition process.

WO2014062133 (Hui Ying Yang et al.) discloses a micro supercapacitor, comprising: a substrate; a first metal electrode; a second metal electrode; an active material coating the first metal electrode and the second metal electrode, comprising manganese oxide ($MnO_2$), carbon nanostructures and optionally a binder; and an electrolyte.

Further High-performance flexible solid-state supercapacitors based on $MnO_2$-decorated nanocarbon electrodes (CNT/CNO) films using the [EMIM][NTf2]-PVdF(HFP) gel electrolyte is reported in RSC Adv. 11 Sep. 2013, 3, 20613 by Yang Gao, et al.

The synthesis of a solid-state supercapacitor based on a CNPs/$MnO_2$ nanorod hybrid structure through a simple flame synthesis method and electrochemical deposition process is disclosed in ACSNANO, review Oct. 26, 2011. Ruthenium Oxide ($RuO_2$) is one of the highest specific pseudo-capacitive electrode materials among the transition metals along with high chemical and thermal stability and good electrochemical redox properties. Although it offers higher capacitance, high cost and the rarity of the material it was added to cheapest carbon electrochemical double layer electrode materials. Amorphous hydrous $RuO_2$ will show higher specific capacitance than that of the crystalline as the intergranular water surface structure involves proton transport where as the oxide allows electronic conduction (Electrochimica Acta, 2006, 52, 1742-1748).

Tung-Feng Hsieh in Carbon (2012) 50, 1740-1747 discloses preparation of composite electrodes vertically aligned multi-walled carbon nanotubes (MWCNTs) coated with hydrous ruthenium dioxide ($RuO_2$/$nH_2O$), wherein the specific capacitance when using $RuO_2$ $nH_2O$/MWCNT/Ti as electrodes in 1.0 M $H_2SO_4$ aqueous solution can reach up to 1652 F/g at a scan rate of 10 mV/s.

Further Rituraj Borgohain et al. (J. Phys. Chem. C, 2012, 116 (28), pp 15068-15075) describes electrochemical study of functionalized carbon nano-onions for high-performance supercapacitor electrodes, wherein composite having $RuO_2$ has specific capacitance of 334 F/g at a potential sweep rate of 20 mV/s with high power (242.8 kW/kg) and high energy density (11.6 Wh/kg).

"Microwave-polyol synthesis of nanocrystalline ruthenium oxide nanoparticles on carbon nanotubes for electrochemical capacitors" is reported in Electrochimica Acta Volume 55, Issue 27, 30 Nov. 2010, Pages 8056-8061 Ji-Young Kim et al. The specific capacitance was 450 F/g of ruthenium oxide/CNT composite electrode with 70 wt % ruthenium oxide at the potential scan rate of 10 mV/s. Further synthesis of carbon nano-onion and nickel hydroxide/oxide composites as supercapacitor electrodes" by Marta E. Plonska-Brzezinska et al. is reported in RSC Adv., 15 Oct. 2013,3, 25891-25901 (1225.2 F/g for $CNOs/Ni(OH)_2$ and 290.6 F/g for CNOs/NiO, both at 5 mV/s).

Although considerable effort has been developed to enhance device performance so far, inefficient ionic and electronic transport in pseudocapacitive electrodes has led to capacitance fading over cycling or at high rates. In fact ionic and electronic transport kinetics are extremely important aspects in energy storage systems and that implies the critical significance of the electrode material's structure and morphology in achieving high power and energy densities, long cycle life, and high rate capability.

In case of nanoporous carbon supercapacitors counterions enter pores to form endohedral supercapacitors, which have a negative surface curvature. Graphene based materials have zero curvature, and one dimensional capped CNTs have a positive surface curvature, whereas, counterions can only reside on the outer surfaces, leading to exohedral supercapacitors (Chem. Eur. J., 2008, 14, 6614). These positive surface curvature carbon electrodes can be charged at a high rate, approaching electrolytic capacitors.

There are few methods known in the art for the production of Carbon Nano-Onions (CNOs) can be by the annealing of detonation nanodiamond powders in an inert atmosphere at temperatures above 1400° C. which leads to their graphitization and formation of CNO. However the efficiency of this technique is limited because of the unmanageable reaction, complex equipment, and high cost. The CNOs obtained from the nanodiamond soot showed to have specific electrochemical capacitance in the range of 20-40 F/g and further functionalization with polyaniline improved it to 640 F/g.

Therefore, there is need for efficient source of CNOs for fabricating high performance supercapacitors than conventional graphitic/mesoporous/activated carbons. Accordingly, the inventors have developed simple, cheaper, less complicated and green approach for the synthesis of CNOs using pure ghee (clarified butter) and comparatively at low temperature, 800° C., as an electrode for fabricating high performance electrochemical supercapacitors in presence of transition metal oxide.

SUMMARY OF THE INVENTION

The main objective of the present invention is to provide a nanocomposite of multilayer fullerenes with transition metal oxide nanoparticles and a process for the preparation thereof.

Another objective of the present invention is to provide a nanocomposite of multilayer fullerenes with transition metal oxide nanoparticles with enhanced specific capacitance.

Another objective of the present invention is to provide a simple, cheaper and green approach for synthesis of activated multilayer graphitized fullerene in the form of nano-onions (CNOs) at low temperature from the pure ghee (clarified butter) for fabricating high performance exohedral type of super capacitors by incorporating suitable transition metal oxide.

Accordingly, the present invention provides a supercapacitor nanocomposite comprising non-porous multilayer fullerenes and transition metal oxide nanoparticles with enhanced specific capacitance in the range of 216-1207 F/g at a scan rate in the range of 100-1 mV/s in $H_2SO_4$.

In an embodiment of the present invention surface area of non-porous multilayer fullerenes is 486 $m^2/g$.

In one embodiment of the present invention 0.5 H2SO4 is used.

In another embodiment of the present invention non-porous multilayer fullerenes are carbon nano-onions (CNOs).

In another embodiment of the present invention the transition metal oxide is $MnO_2$.

Still in another embodiment of the present invention diameter of metal in the nano-composites exhibit 10 nm.

Still in another embodiment of the present invention a process for preparation of supercapacitor nanocomposite, wherein the said process comprising the steps:
  i. collecting thermal black carbon on a glass or ceramic plate directly from the flame of burning ghee;
  ii. annealing the thermal black carbon as obtained in step (i) at the temperature 800° C. under an inert atmosphere to get activated multilayer fullerene in nano-onions forms (CNOs);
  iii. dispersing activated multilayer fullerene in nano-onions forms (CNOs) obtained in step (ii) in water then adding $KMnO_4$ followed by sonication;
  iv. subjecting the mixture obtained from step (iii) to hydrothermal reaction in microwave oven at the radiation ranging between 200 W at the temperature 130° C. for a period of 15 min;
  v. cooling the mixture obtained in step (iv) followed by separating the composite by vacuum filter to get nano-composites;
  vi. annealing the nano-composite obtained from step (v) at the temperature 800° C. under an inert gas for a period of 4 h to obtain supercapacitor nanocomposite.

Still in another embodiment of the present invention optionally incorporating transition metal oxide on thermal carbon black as obtained in step (i) using microwave hydrothermal reaction to obtain nanocomposite subsequently annealing the obtained composite at 800° C. under an inert atmosphere to get activated multilayer non-porous, transition metal oxide nanocomposite of CNOs.

DETAILED DESCRIPTION OF THE PREFERRED EMBODIMENT

Figure 1:
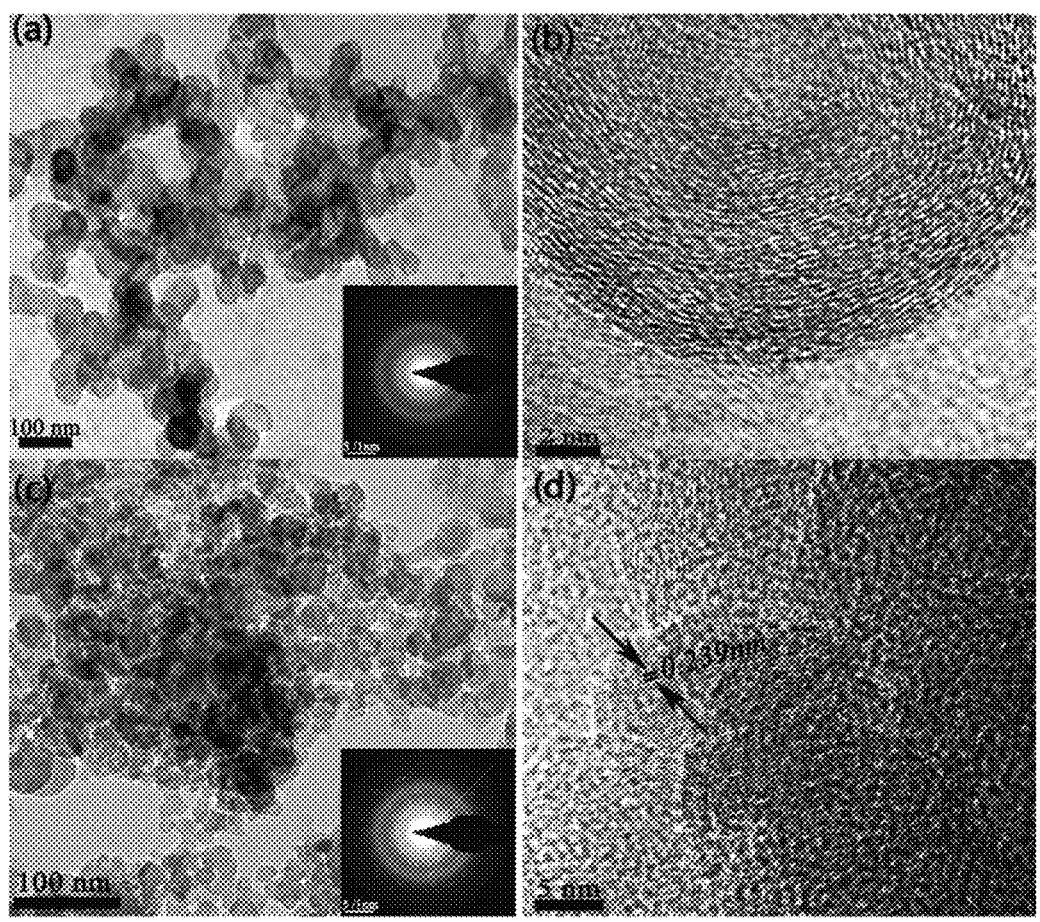
FIG. 1 depicts TEM and HRTEM images of (a and b) CNOs and (c and d) $MnO_2$/CNOs. Insets are the corresponding SAED patterns.

The invention will now be described in detail in connection with certain preferred and optional embodiments, so that various aspects thereof may be more fully understood and appreciated.

The invention provides a simple, cheaper and green approach for low temperature synthesis of functionalized multilayer fullerene from the pure ghee (clarified butter) to get activated multishell graphitized non-porous CNOs, wherein the positive surface curvature of these CNOs provided a good balance between the surface area and the electrolyte accessibility with improved capacitance.

Further, the present invention provides a supercapacitor composite electrode, comprising highly pseudocapacitive, non-porous (CNOs) and transition metal oxide nanoparticles with enhanced specific capacitance in the range of 216 F/g at 100 mV/s scan rate and 1207 F/g at 1 mV/s scan rate.

In yet another aspect, the invention provides process for synthesis of transition metal oxide nancomposites of CNOs, which leads to more conductive network with further enhanced capacitance.

The invention provides a simple, cheaper and green approach for low temperature synthesis of functionalized multilayer fullerene from the pure ghee (clarified butter) to get activated multishell graphitized non-porous fullerene in the form of carbon nano-onions (CNOs), wherein the positive surface curvature of these CNOs provided a good balance between the surface area and electrolyte accessibility with improved capacitance. The invention provides a low temperature process for synthesis of multilayer fullerenes, according to claim 1, comprising steps of;
 a) collecting thermal black carbon on a glass or ceramic plate directly from the flame of burning ghee (clarified butter); and
 b) annealing collected carbon at 800° C. under an inert atmosphere to get activated multishell/multilayer fullerene in nano-onions forms.

The invention provides exohedral type supercapacitor composite comprising non-porous CNOs and transition metal oxide nanoparticles with enhanced specific capacitance in the range of 216 F/g at a scan rate of 100 mV/s in aqueous 0.5 M H$_2$SO$_4$. The transition metal oxides are selected from the group consisting of MnO$_2$ nanoparticles. The average particle size of transition metal oxide nanoparticles is ~10 nm.

The invention provides MnO$_2$/CNOs composite with significant capacitance.

The invention provides process for the preparation of exodedral type supercapacitor comprising transition metal oxide nanocomposite of CNOs having high specific capacitance comprising steps of;
 a) collecting thermal black carbon on a glass or ceramic plate directly from the flame of burning ghee (clarified butter);
 b) incorporating transition metal oxide on thermal carbon black, by using microwave hydrothermal reaction to obtain composite.
 c) annealing the composite at 800° C. under an inert atmosphere to get activated multishell non-porous transition metal oxide nanocomposite of CNOs;

According to the process, the transition metal oxide is preferably MnO$_2$ wherein the transition metal oxide nanocomposite of CNOs is preferably the MnO$_2$/CNOs composite, which is prepared by microwave hydrothermal reaction;

The invention provides in situ process for the preparation of MnO$_2$/CNOs composite, comprising steps of;
 a) collecting thermal black carbon on a glass or ceramic plate directly from the flame of burning ghee;
 b) dispersing thermal carbon black in DI water, then adding KMnO$_4$ followed by sonication;
 c) subjecting mixture (b) to hydrothermal reaction in microwave oven at 200 W at 130° C. for 15 min;
 d) cooling the mixture at room temperature; separating the composite by vacuum filter; and
 e) annealing the composite at 800° C. under an inert gas for 4 h to obtain desired MnO$_2$/CNOs composite with high specific capacitance.

Further the synthesized MnO$_2$/CNOs composite material is then subjected to structural and elemental characterization by using known techniques such as XRD, TEM microscopy, Raman spectroscopy, FT-IR, TGA and like thereof.

The CNOs and MnO$_2$/CNOs composite material is further loaded on to carbon paper to make electrodes for the electrochemical measurements, wherein slurry of electrode material is made in presence of organic solvent such as THF (without binder), followed by brush coating on area of current collector carbon paper on both sides, finally dried under IR light for about 10 min. The electrochemical measurements are carried out on a SP-300 multichannel electrochemical workstation (Biologic Science Instruments) at room temperature.

The specific capacitance of active electrode material made up of metal oxide composite of CNOs is measured by means of Galvonostatic discharge (two electrode system) and Cyclic voltammetry (three electrode system).

The invention provides characterization of composites, preferably $MnO_2$/CNOs hybrid electrode used as exohedral type supercapacitor.

The synthesized non-porous CNOs and its transition metal oxide composites are characterized by the known techniques such as TEM, XRD, Raman Spectroscopy, FTIR, XPS, TGA.

Structural and Elemental Characterization

XRD was obtained from diffractometer system, XPERT-PRO with Goniometer, PW3050/60 (q/q) equipped with a CuKa radio generator and the scan range (2θ) was between 10 and 80°. Morphology of CNOs and $MnO_2$/CNOs was studied by transmission electron microscopy (TEM) using a Tecnai F30 FEG machine and Raman spectra were recorded on a HR 800

Raman spectrometer (Jobin-Yvon, Horiba, France) using 632.8 nm red laser (NRS1500W). XPS spectra were recorded on VG Microtech Multilab ESCA-3000 spectrometer equipped with a non-monochromatic MgKα X-ray (1253.6 eV) source. The IR spectra were recorded on a Perkin-Elmer Spectrum GX FT-IR spectrometer. Thermal gravimetric analysis (TGA) was performed on the as prepared thermal carbon black and composite $MnO_2$/CNOs using a Perkin Elmer STA 6000 simultaneous thermal analyser.

Experimental

Figure 7:
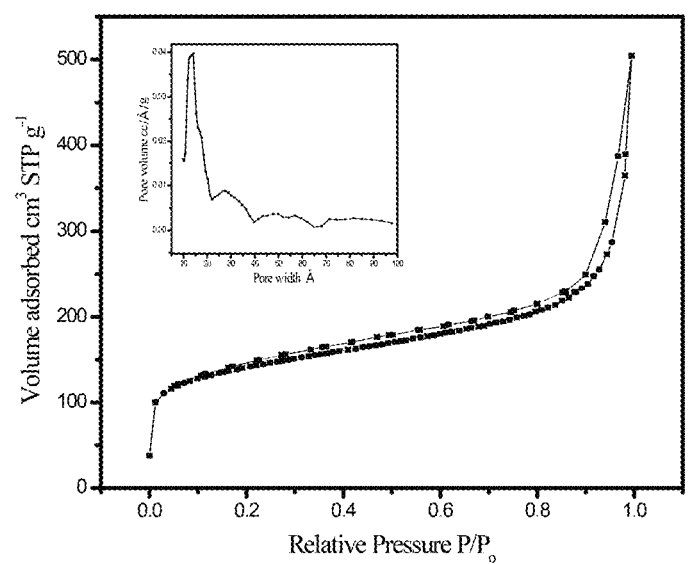
FIG. 7 depicts Nitrogen sorption isotherms at 77 K and the Inset shows pore size distributions of CNOs. The calculated average pore size of CNOs is ranging from 1.2-1.4 nm.

The synthesized CNOs consisted of multilayer fullerene shells at a dimensional size of a few nanometers, with a specific surface area of 486 $m^2$/g (FIG. 7).

TEM images of activated graphitic carbon revealed a continuous chain structure consisting of quasi-periodic CNO beads with a characteristic diameter of 40-45 nm (FIG. 1a). HRTEM images show CNOs with multiple graphitic shells (FIG. 1b). Polycyclic aromatic hydrocarbons are present in high concentrations in the ghee flame and therefore adopt pentagonal rings as they grow so as to generate spheroidal structures which maximize the number of C—C linkages. As is seen in the HRTEM images these spheroidal rings are mostly completely closed but not in all places. Some of the rings are fused with another CNO ring; obviously it is unlikely that many of these aromatic carbon nets will succeed in closing perfectly to form even spheroids.

Figure 8:
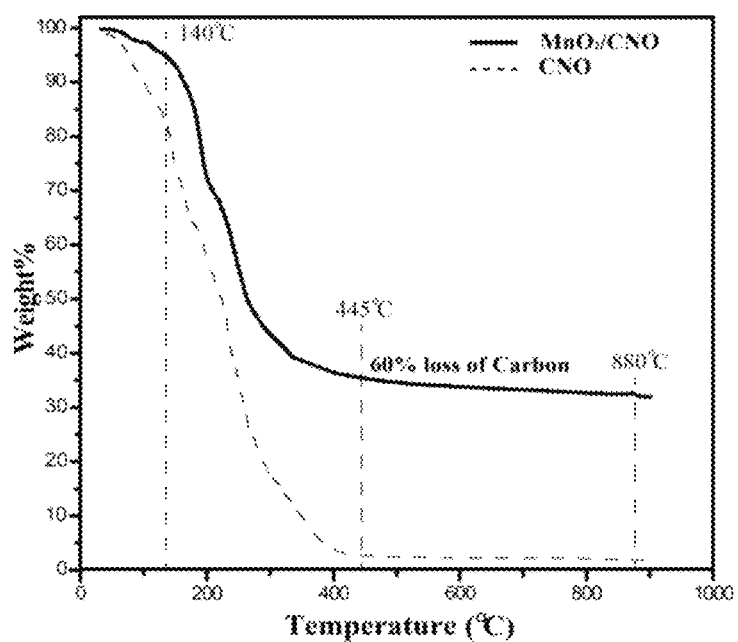
FIG. 8 depicts the CNOs and MnO$_2$/CNOs exhibit weight loss from 30 to 900° C. For the composite 5% weight loss between have been observed between 30 and 140° C. is attributed to the liberation of adsorbed water molecules from the composites. Further weight loss of 60% up to 445° C. corresponds to the loss of CNOs. Henceforth, the amount of MnO$_2$ in the MnO$_2$/CNOs composites is 39%. In addition, it is observed that a final weight loss of 1% after 800° C. is due to the conversion of MnO$_2$ to Mn$_3$O$_4$[Characterization of a manganese dioxide/carbon nanotubes composite fabricated using an in situ coating method Xiaofeng Xie, Lian Gao Carbon, 45, (2007) 2365-2373].

From the SAED pattern of CNO d-spacing obtained, about 3.5° A matches to the (002) plane of graphitic carbon. From the TEM images of thermal carbon black, it is revealed that CNOs are formed in the first step of synthesis but that TGA of the as collected thermal carbon black (FIG. 8) showed further reduction in weight until 445° C. and then stabilized. Therefore this product was annealed at 800° C. to obtain pure graphitic CNOs. In instant case graphitization occurred at very low temperatures typically <800° C. because the formation of CNOs begins in a highly strained form that is rich in defects and which can lower the energy barrier for graphitization.

TEM images of $MnO_2$/CNOs composite demonstrated that the $MnO_2$ nanoparticles are formed on CNO beads (FIG. 1c). HRTEM of the composite revealed that the $MnO_2$ nanoparticles had a diameter of around 10 nm and showed lattice fringes and a d-spacing value of 0.239 nm corresponding to the (311) plane of $\lambda$-$MnO_2$ (FIG. 1d). The SAED pattern in the inset shows lattice points for crystalline $MnO_2$ and clear cycles for CNOs. The TGA of composite (FIG. 8) showed that the as prepared $MnO_2$/CNOs composite contains 39% of $MnO_2$.

Figure 2:
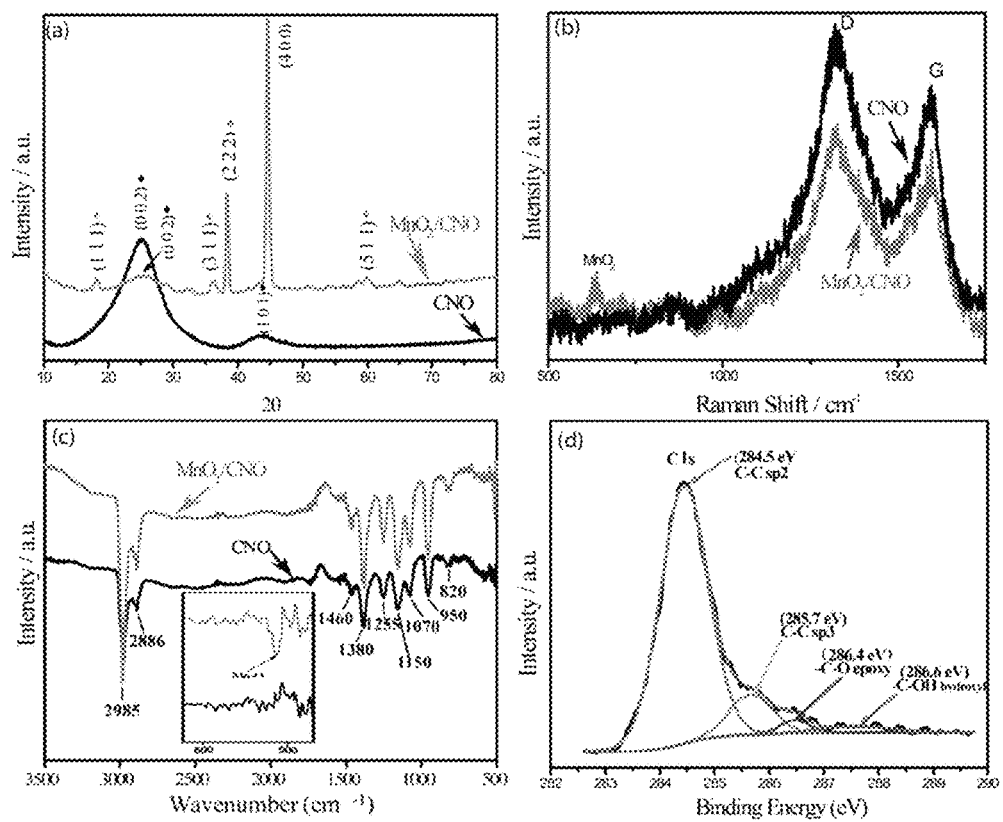
FIG. 2 depicts (a) Powder XRD spectra, (b) Raman spectra and (c) FTIR of CNOs and $MnO_2$/CNOs, inset shows characteristic FTIR peaks of Mn—O—Mn due to the $MnO_2$ present in the composite. (d) Deconvoluted XPS spectra of CNOs.

The X-ray diffraction (XRD) spectra of CNOs and $MnO_2$/CNOs are shown in FIG. 2a. Diffraction peaks at 24 and 44 degrees of 2θ correspond to (002) and (101) planes of graphitic carbon and peaks at 18, 36, 38 44 and 60 degrees of 2θ correspond to (111), (311), (222), (400) and (511) planes of $\lambda$-$MnO_2$ (JCPDS number 44-0992), respectively.

Raman scattering measurements were carried out on CNOs and $MnO_2$/CNOs to analyse the lattice vibrational properties at room temperature. It is well known that Raman spectroscopy allows high throughput identification of various forms of carbon as well as fingerprints for single layers, bilayers, and a few layers reacting changes in the electron bands of graphitic carbon. As seen in FIG. 2b the D band observed at 1325 $cm^{-1}$ can be assigned to defects in the CNOs lattice including $sp^3$ hybridized carbon, and the G band at 1600 $cm^{-1}$ originates from the vibrations of the $sp^2$ hybridized framework. Intensity ratio ($I_D/I_G$) for CNOs is 1.89 indicating surface defects due to the abundant presence of surface functional groups like —CH, —OH, C—$NO_2$ etc. For the $MnO_2$/CNOs composite the $I_D/I_G$ ratio is 1.64, indicating a decrease in the number of surface defects as these oxygen containing functional groups of CNOs are involved in reaction with $KMnO_4$ for the formation of $MnO_2$ nanoparticles. Another peak appearing at 640 $cm^{-1}$ in case of $MnO_2$/CNOs hybrid material is the characteristic peak of the $MnO_2$ lattice.

The surface condition and properties of carbon nanomaterials depend very much on preparation and conditioning procedures e.g. the type of initial organic compound from which pyrolytic carbon is generated. FTIR studies of multilayer fullerenes i.e. CNOs are carried out to ascertain the functional groups present on its surface (FIG. 2c). The spectra reveals the presence of O and N impurities in the form of functional moieties such as —OH, C—$NO_2$ etc. which might have been created during synthesis.

Predominant absorption exhibited at 2985 $cm^{-1}$ can be assigned to aliphatic C—H stretching vibrations and the peak at 1460 $cm^{-1}$ can be assigned to C—H bending vibrations. The peaks between 1150, and 1255 $cm^{-1}$ are due to stretching vibrations of C—O single bonds in the ether and phenolic structures whereas, the peak at 1380 $cm^{-1}$ can be attributed to NO stretching vibrations in C—$NO_2$ structure. The peak at 1070 $cm^{-1}$ can be assigned to C—OH stretching vibration mode. The FTIR spectrum of composite $MnO_2$/CNOs shows the appearance of an extra peak at 517 $cm^{-1}$ the same is attributed to the vibration due to the displacement of the oxygen anions of Mn—O—Mn along the direction of the octahedral chains. The pseudocapacitance exhibited by the CNOs as revealed by CV may thus be attributed to these surface functional moieties. The XPS spectrum of C is (FIG. 2d) has been deconvoluted into four peaks at 284.5, 285.7, 286.4 and 286.6 eV. The strong intense peak obtained at 284.5 eV is evidence of the binding energy of the $sp^2$ hybridized state that corresponds to the strong C—C bond; the other peaks at 285.7 eV, 286.4 and 286.6 eV are for $sp^3$ hybridized states related to C—C, C—O (epoxy), and C—OH bonds in CNOs, respectively.

The electrochemical performance of CNOs and $MnO_2$/CNOs was evaluated as capacitive electrodes using a conventional three-electrode system with Hg/HgSO$_4$ as the reference electrode and Pt foil as the counter electrode in an aqueous electrolyte solution of 2.5 and 0.5 M H$_2$SO$_4$. The samples were characterized with CV, EIS and galvanostatic charge-discharge measurements. Galvanostatic charge-discharge measurements are performed in two electrode system.

Figure 3:
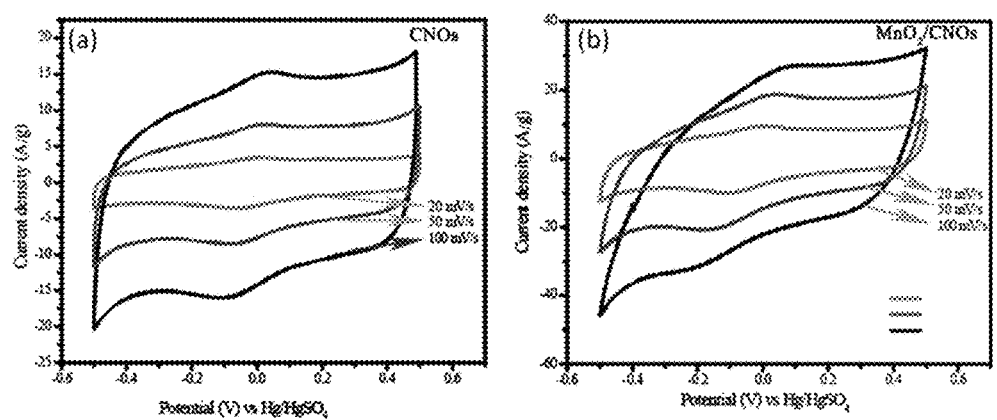
FIG. 3 depicts (a and b) CV curves for CNOs and $MnO_2$/CNOs at various scan rates ranging from 100 to 20 mV/s in the voltage range of −0.5 to 0.5 V respectively

FIG. 3a shows capacitance vs. potential curves for CNOs at the scan rates of 20, 50 and 100 mV/s. The cyclic voltammogram of CNOs is reasonably rectangular but shows reversible redox peaks cantered at −0.1 and +0.1 V. This suggests that these CNOs display characteristics of electric double layer capacitance as well as pseudocapacitance. In case of redox surface functionalities, a significant redox pseudocapacitance (C$_\psi$) arises as well as the predominant double layer capacitance (C$_{d1}$). In fact with some carbon materials it appears that C$_\psi$ can amount to 5-10% of total realizable capacitance and scales approximately with the C$_{d1}$ value.

Additionally, functional groups present on the surface of CNOs improve wettability by the electrolyte which results in increased specific capacitance. Even mild changes in surface functional groups can change specific capacitance dramatically.

Specific capacitances from CV measurements have been calculated by using following formula;

$$C_{CV} = (\int I dV)/vmV \quad (1)$$

where, C$_{CV}$ is the specific capacitance in F/g, I is the response in current in A, v is the scan rate in V/s, m is mass of loaded active electrode material in g and V the potential window in V.

Figure 4:
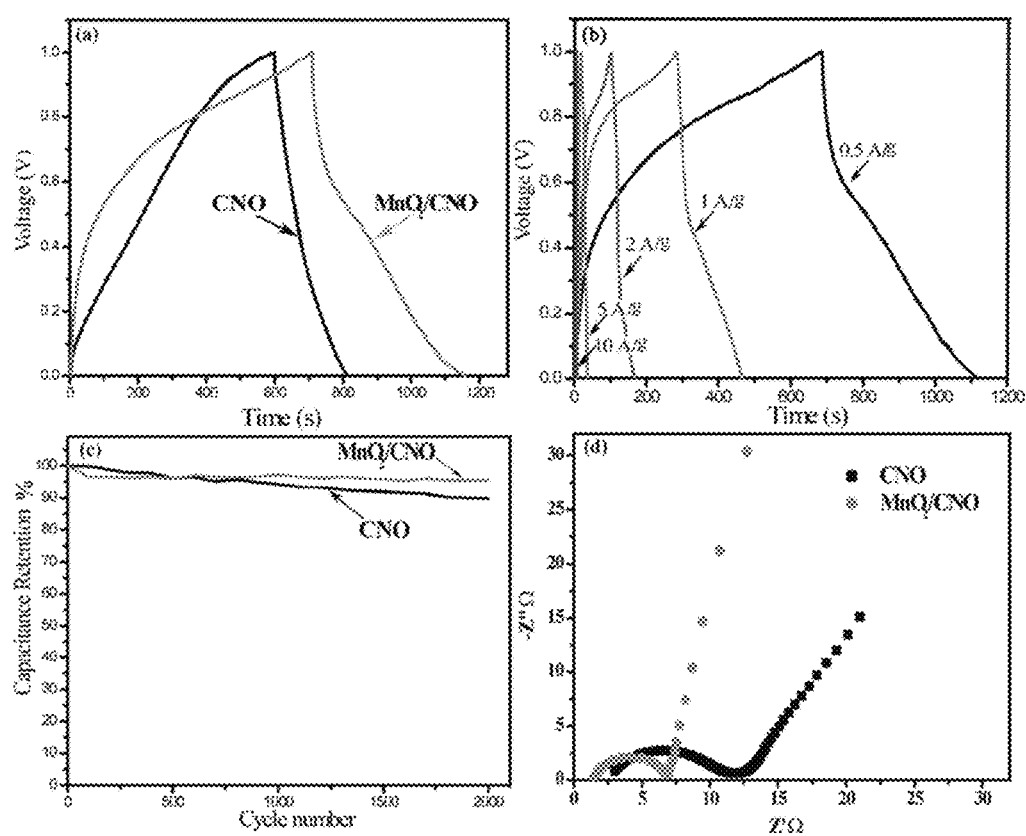
FIG. 4 depicts (a) Galvanostatic charge-discharge curves of CNOs and MnO$_2$/CNOs at 0.5 A/g; (b) Galvanostatic charge-discharge plots of MnO$_2$/ CNOs for various constant currents ranging from 0.5 to 10 A/g in the voltage range of 0-1 V in 0.5 M H$_2$SO$_4$ electrolyte; (c) Corresponding capacitance retention percentage of CNOs and MnO$_2$/CNOs for 2000 cycles at the constant current density of 10 A/g; (d) Nyquist plots of CNOs and MnO$_2$/CNOs composites with a frequency range from 0.1 MHz to 0.1 Hz.

The average specific capacitance of the CNOs electrode was calculated from the CV curves which show an initial decrease with increasing scan rate from about 134 F/g at a scan rate of 20 mV/s to 118 F/g at 100 mV/s (FIG. 3a) in a 2.5 M H$_2$SO$_4$. When 0.5 M H$_2$SO$_4$ is used as the electrolyte, CNOs showed specific capacitance of 112 F/g at a scan rate of 100 mV/s. FIG. 3b shows rate dependent CVs of MnO$_2$/CNOs composite supercapacitor electrode, at the scan rate of 20 mV/s the hybrid electrode of MnO$_2$/CNOs shows enhanced capacitance of 352 F/g retained to 216 F/g at 100 mV/s. This demonstrates that the hybrid MnO$_2$/CNOs electrode yields a highly improved performance compared to that of only CNOs. The capacitive performance was further investigated with galvanostatic charge-discharge cycling experiments. FIG. 4a shows comparative galvanostatic discharge curves for CNOs and hybrid MnO$_2$/CNOs electrodes and FIG. 4b shows the corresponding galvanostatic discharge curves for the hybrid MnO$_2$/CNOs electrode at various current densities of 0.5, 1, 2, 5 and 10 A/g. The specific capacitance for the two-electrode system was calculated from the galvanostatic charge-discharge values by using the following equation:

$$C_s = 2I/(-[dv/dt]m) \quad (2)$$

Where C$_s$ is the specific capacitance (F/g), I is the current applied in A, m is the mass of active electrode material in g, and [dv/dt] is the slope of the discharge curve and numerical factor 2 represents two equivalent single electrodes connected in series.

Owing to the significant pseudocapacitance contributions from MnO$_2$, at a current density of 0.5 A/g the hybrid MnO$_2$/CNOs electrode exhibited a specific capacitance as high as 575 F/g (based on the active material) whereas the specific capacitance of CNOs was 171 F/g (FIG. 4a). As seen in FIG. 4b specific capacitance retained significantly even at a current density as high as 10 A/g indicates the great potential of the CNOs based hybrid electrodes for high power operation.

Excellent cycling stability is crucial for real supercapacitor operation. To test the electrochemical stability of the MnO$_2$/CNOs hybrid electrode, the charge-discharge cycling was performed at a relatively high current density of 10 A/g. It is stable up to 94% even for the 2000th cycle at a constant current density 10 A/g; there was only 6% capacity loss after 2000 consecutive cycles, indicative of excellent long-term electrochemical stability (FIG. 4c). CNOs also exhibit good stability with capacitance retention of about 89.4% at the 2000th cycle at 10 A/g.

FIG. 4d shows Nyquist plots of CNOs and the MnO$_2$/CNOs hybrid in the frequency range from 0.1 MHz to 0.1 Hz. The MnO$_2$/CNOs electrode has good conductivity and low internal resistance which has been manifested from the intercept of the Nyquist curve on the real axis (Z' 'Ω) which is 1.4 'Ω. Furthermore the charge transfer resistance is 5.657 'Ω for MnO$_2$/CNOs, whereas the CNOs have electrode resistance of 12.3 'Ω. The more vertical shape at lower frequencies for MnO$_2$/CNOs indicates the more capacitive behaviour of this electrode. The composite shows more capacitive behaviour than CNOs probably because CNOs have abundant oxide groups on the surface. In case of the composite, these oxygen containing functional groups are involved in the formation of MnO$_2$ nanoparticles and hence the composite electrode showed a lower resistance and more capacitive behaviour.

Another reason for the high capacitance from these electrodes may be the interparticle porosity generated by tiny gaps between CNO beads in a chain. Although the CNOs themselves are not porous, porosity measurements revealed that these CNO chains have pores of size of around 1.4 nm. In the case of CNOs in chain structures, along with the exohedral type of ion adsorption, interparticle porosity could also contribute towards efficient ion adsorption and lead to enhanced capacitance.

EXAMPLES

The following examples are given by way of illustration of the working if the invention is actual practice and shall not be construed to limit the scope of the present invention in anyway.

Materials

Clarified butter popularly known as 'ghee' in the Indian subcontinent and was obtained from AMUL (Anand Milk Union Limited, an Indian dairy cooperative). Potassium permanganate (KMnO$_4$), tetrahydrofuran (THF) and sulphuric acid (H$_2$SO$_4$) are used as received (S. D. Fine-Chem Ltd, India).

Example 1

Synthesis of CNOs and MnO$_2$/CNOs

CNOs were prepared by collecting thermal black carbon on a glass or ceramic plate directly from the flame of burning ghee. For 25 g of 'ghee' the carbon black collected was 0.5 g. The collected carbon was then annealed at 800° C. for the time of under an inert atmosphere to get activated multishell graphitized CNOs. After annealing the final yield of CNOs was 1% of used precursor.

The MnO$_2$/CNOs composite was prepared by microwave hydrothermal reaction. 50 mg of thermal carbon black was dispersed in 160 ml of deionized water; 2.5 mg of KMnO$_4$ was added to it and the mixture was sonicated for 1 h followed by probe sonication for 10 minutes. Then the hydrothermal reaction was carried out in a microwave oven at 200 W, 130° C. for 15 min. After cooling to ambient room temperature, (30° C.) the composite was separated out by vacuum filter and annealed at 800° C. under an inert gas for 4 h.

Electrochemical Measurements

Figure 5:
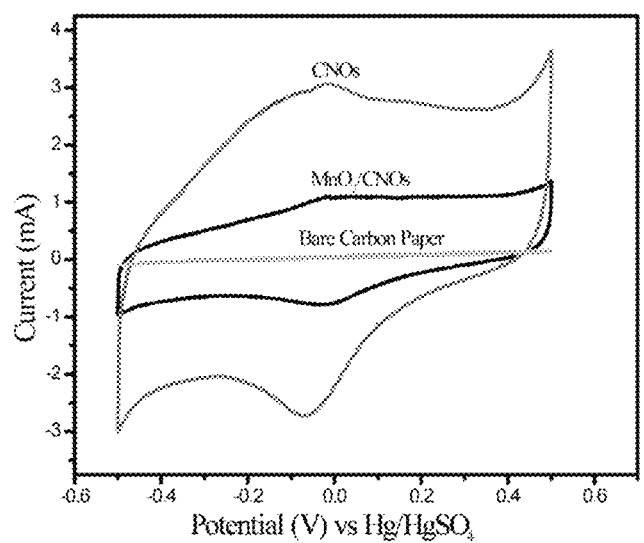
FIG. 5 depicts Comparative cyclic voltamogram shows the contribution of bare carbon paper which was used as the current collector at the scan rate of 5 mV/s.
Figure 6:
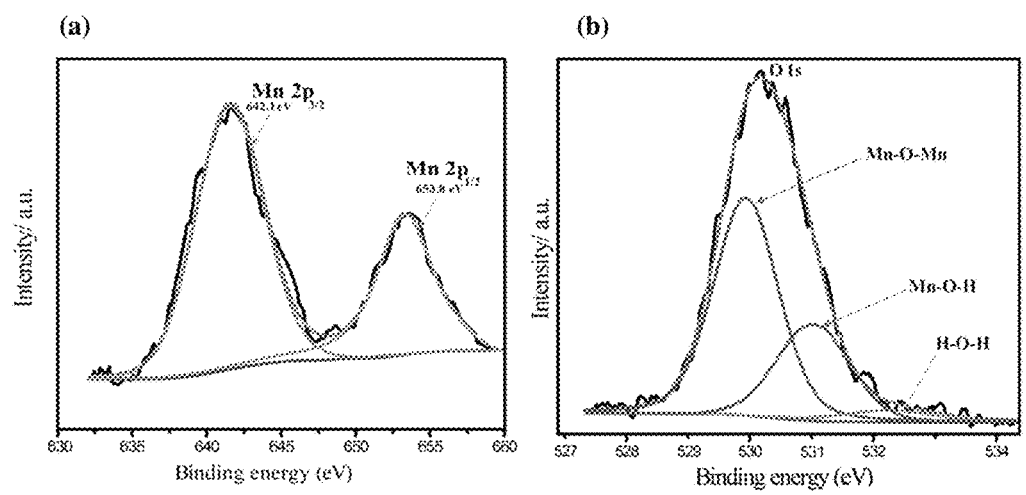
FIG. 6 depicts the XPS measurements have been taken to study the components and oxidation states of OLC and OLC/MnO$_2$ composite. In figure (a) the binding energies 642.1 eV and 653.8 eV Corresponding to Mn 2p band for the binding energies 2p$_{3/2}$ and 2p$_{1/2}$ which proves that the Mn in the composite is having oxidation state IV. The XPS of O1s the has been deconvoluted into three components (fig b); the binding energy at 529.86 eV gives the evidence for Mn—O—Mn bonds for the tetravalent oxide which has highest intensity among others and the another binding energy at 531.19 eV shows that the hydroxide group has been bound to manganese Mn—OH; the binding energy at 532.48 eV corresponds to H—O—H bonds.

CNOs and MnO$_2$/CNOs composite materials were then loaded on to carbon paper (capacitance of about 0.02 F, FIG. 5) to make electrodes for the electrochemical measurements. A slurry of electrode material was made with THF as the solvent (without binder) and brush coated on to a 1×1 cm area of current collector carbon paper on both sides. Finally it was dried under IR light for 10 min. The total weight of the electrode material coated on both sides of carbon paper was kept constant i.e. ~1 mg for all electrochemical measurements. Electrochemical measurements were carried out on a SP-300 multichannel electrochemical workstation (Biologic Science Instruments) at room temperature. Electrochemical studies based on cyclic voltammetry (CV), electrochemical impedance spectra (EIS) were done by a conventional three electrodes system with Hg/HgSO$_4$ as the reference electrode and platinum (Pt) foil as the counter electrode in aqueous 0.5 M and 2.5 M of H$_2$SO$_4$. Galvanostatic charge discharge was done by a two electrode system in 0.5 M of H$_2$SO$_4$ electrolyte. All the calculated values were normalized with weight of the electrodes.

Advantages of the Invention

The simple, cheaper, less complicated and green approach has been for the synthesis of CNOs using pure ghee (clarified butter) and comparatively at low temperature, 800° C., as an electrode for fabricating high performance electrochemical supercapacitors in presence of transition metal oxide.

What is claimed is:

1. A process for preparation of a supercapacitor nanocomposite, wherein the said process comprises:
   i. collecting thermal black carbon on a glass or ceramic plate directly from a flame of a burning ghee;
   ii. annealing the thermal black carbon obtained in step (i) at a temperature of 800° C. under an inert atmosphere to obtain an activated multilayer fullerene in a nano-onions form (CNOs);
   iii. dispersing the activated multilayer fullerene in the nano-onions form (CNOs) obtained in step (ii) in water, then adding KMnO$_4$ followed by sonication;
   iv. subjecting the mixture obtained from step (iii) to a hydrothermal reaction in a microwave oven at a radiation ranging between 200 W at a temperature of about 130° C. for a period of 15 minutes;
   v. cooling the mixture obtained in step (iv) followed by separating a composite by a vacuum filter to a obtain nanocomposite; and
   vi. annealing the nanocomposite obtained from step (v) at a temperature of 800° C. under an inert gas for a period of 4 hours to obtain a supercapacitor nanocomposite.

2. The process as claimed in claim 1, further incorporating a transition metal oxide on the thermal black carbon obtained in step (i) using a microwave hydrothermal reaction.

3. The process as claimed in claim 2, wherein the transition metal oxide is MnO$_2$.

* * * * *